W. H. PERRIN.
SHEAF SHOCKER.
APPLICATION FILED FEB. 14, 1917.
1,346,974.
Patented July 20, 1920.
6 SHEETS—SHEET 3.
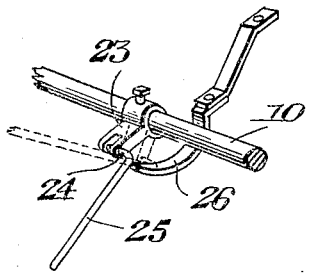
Fig. 7.
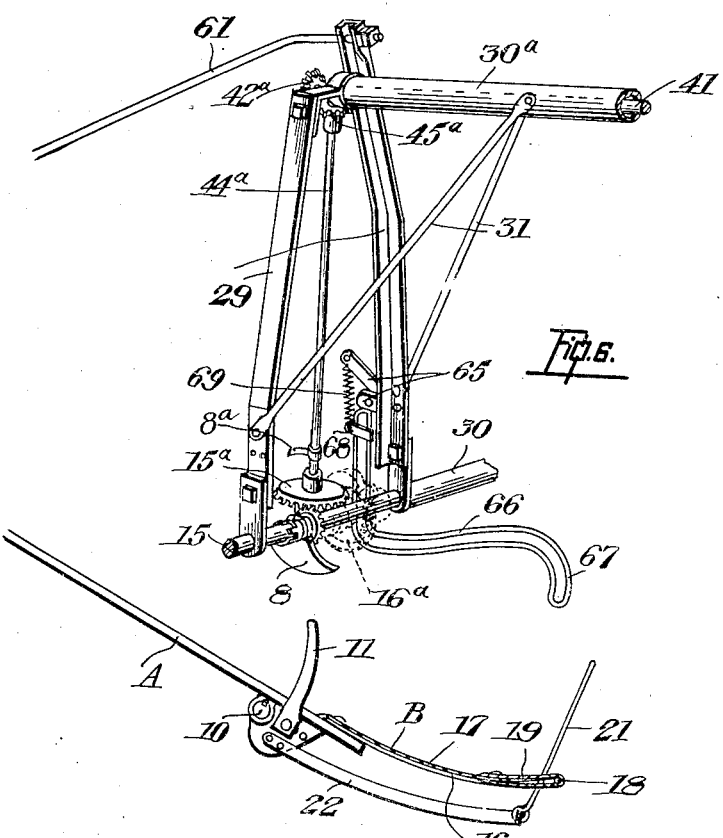
Fig. 6.
Fig. 4.
WITNESSES
INVENTOR
W.H. PERRIN.
BY Featherstonhaugh & Co.
ATTYS.

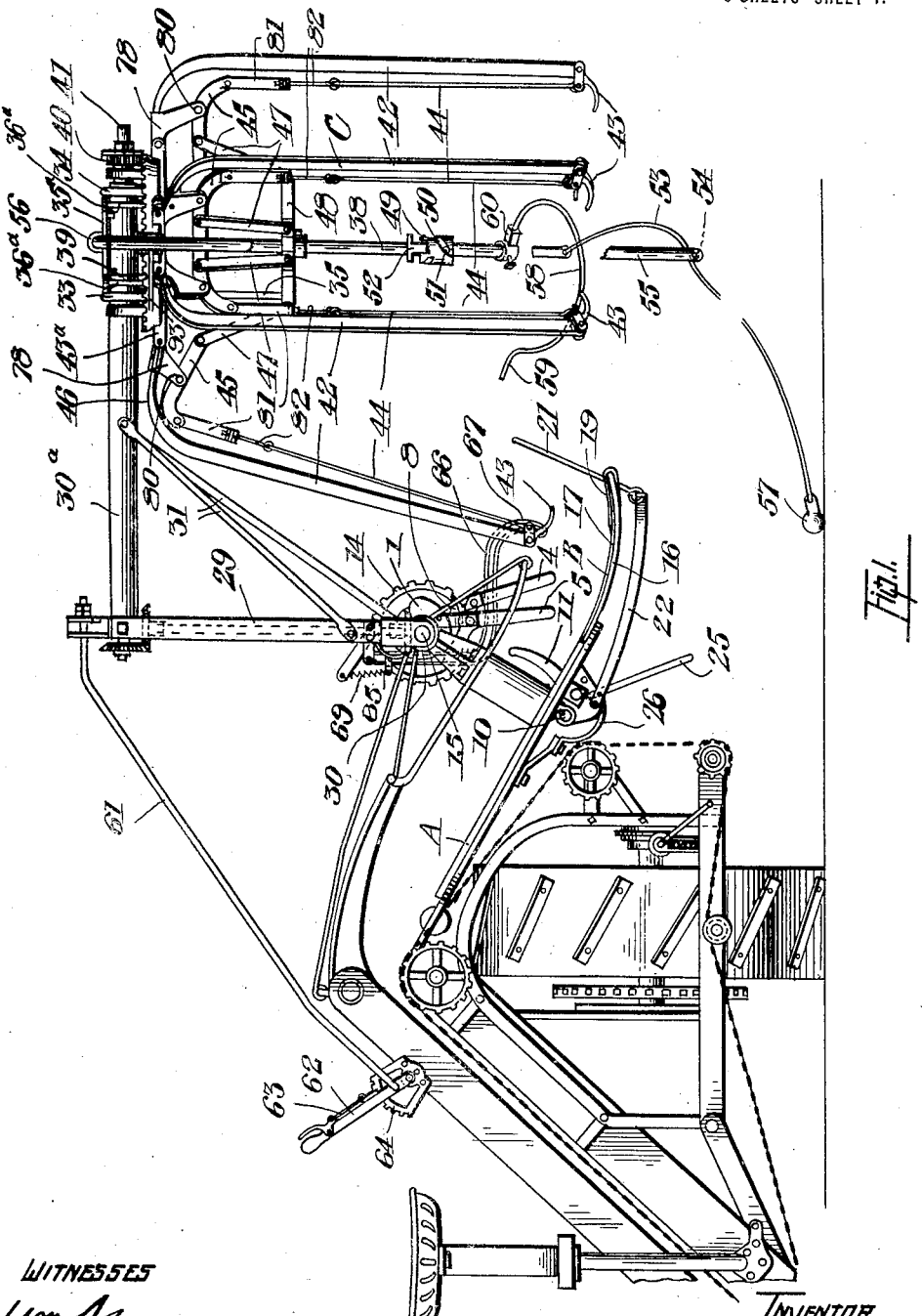

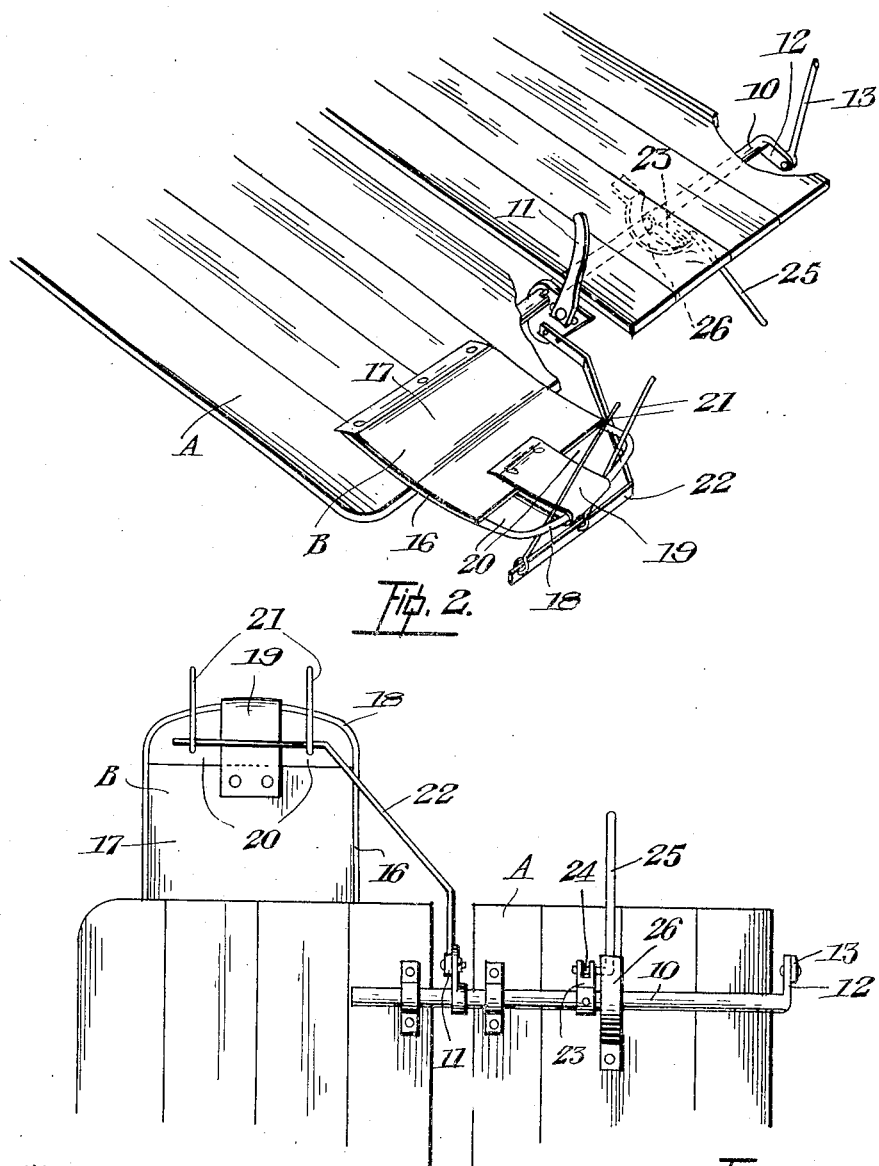

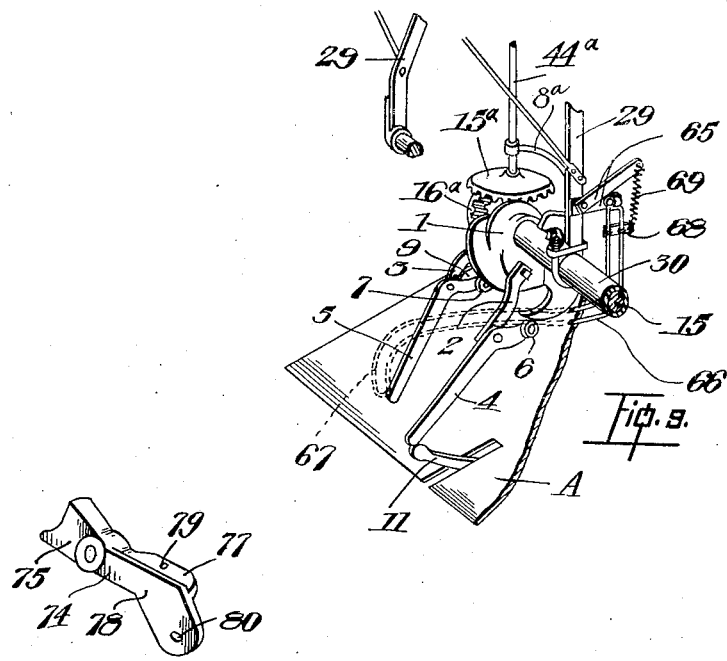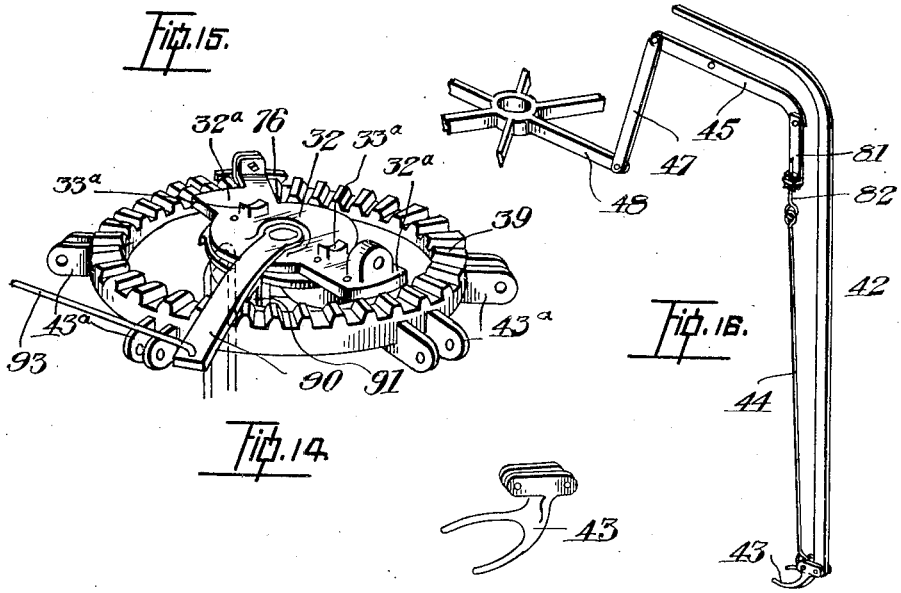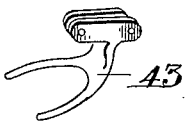

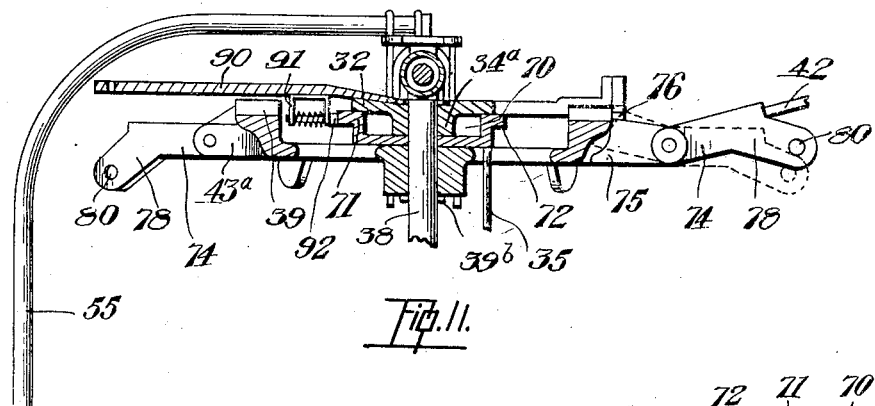
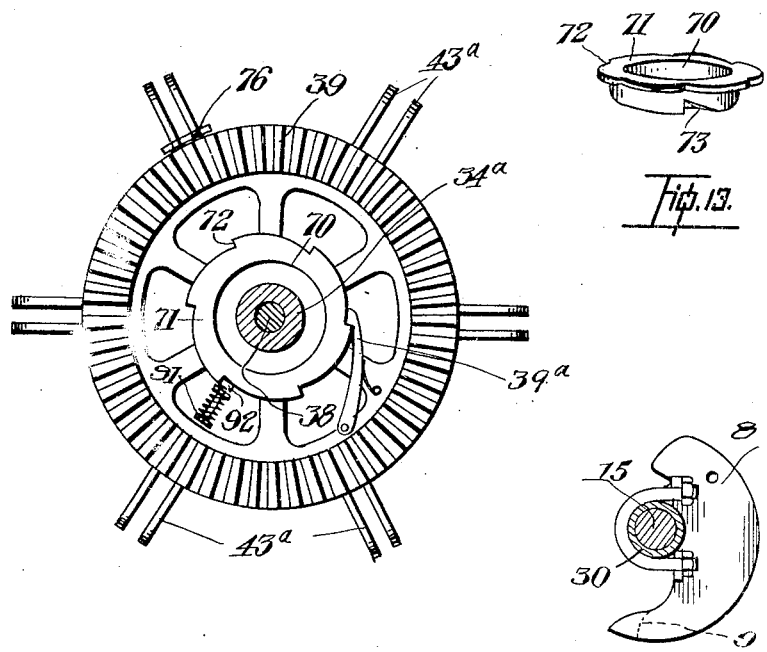

UNITED STATES PATENT OFFICE.

WILLIAM HUMPHREY PERRIN, OF NEW LISKEARD, ONTARIO, CANADA, ASSIGNOR TO PERRIN SHOCKER MANUFACTURING COMPANY, LIMITED, OF NEW LISKEARD, ONTARIO, CANADA.

SHEAF-SHOCKER.

1,346,974.  Specification of Letters Patent.  Patented July 20, 1920.

Application filed February 14, 1917. Serial No. 148,603.

*To all whom it may concern:*

Be it known that I, WILLIAM HUMPHREY PERRIN, a subject of the King of Great Britain, and resident of the town of New Liskeard, in the Province of Ontario, in the Dominion of Canada, have invented certain new and useful Improvements in Sheaf-Shockers, of which the following is a full description.

This invention relates to improvements in sheaf shockers of the type in which the sheaves are caught as they are disengaged from the binder on suitable hooks which rotate in a horizontal plane and are adapted to simultaneously discharge the sheaves in the form of a shock.

The objects of the invention are to facilitate the effective formation of shocks whereby, when it falls there will be no liability of undue flattening out, but the several sheaves will be maintained in position to obtain the desired result.

Further objects are to obviate the liability of the sheaves slipping downwardly during the period of forming the shock, so that when they are deposited they will fall uniformly together in the manner best calculated to produce a firm and properly shaped shock.

Further objects still are to adequately support the rear sheaves of the shock, so that during the operation of depositing the same, they will not impact with the front sheaves and so displace the same, to readily hold the head of the sheaf during the period of discharge from the binder deck, so that the up-ending of the sheaf while forming the shock will be easily and automatically accomplished, and generally to adapt the various working parts to better perform the functions required of them.

In the drawings,

Figure 1 is a fragmentary end elevation of a binder embodying the present invention.

Fig. 2 is a fragmentary perspective view of the end of the binder deck showing the sheaf engaging means operatively mounted thereon.

Fig. 3 is a plan view of the same.

Fig. 4 is a side elevation of the binder deck, part being in section, showing the sheaf engaging means mounted thereon.

Fig. 6 is a perspective view of the adjustable standards operatively supporting the shock forming mechanism.

Fig. 7 is a perspective view of the sheaf supporting finger operatively mounted on the compressor arm shaft and showing the location of the actuating cam surface coacting with the said finger.

Fig. 9 is a fragmentary perspective view of the knotter shaft showing the cam means actuating the discharge arms.

Fig. 10 is a side elevation of one of the cams designed to actuate the discharge arms.

Fig. 11 is a transverse section of the crown gear actuating the sheaf supporting arms and showing the location of the rearwardly extending arm which engages the flexible member.

Fig. 12 is a plan view of the gear carried by the stook forming mechanism showing the location of the cup-shaped tripping device mounted thereon.

Fig. 13 is a perspective view of the cup-shaped tripping device.

Fig. 14 is a perspective view of the gear mounted on the stook forming mechanism, and showing the location of the plate supporting the rearwardly extending arm and coacting with the cup-shaped tripping member.

Fig. 15 is a perspective view of the bracket securing the arms of the stook forming mechanism to the gear.

Fig. 16 is a fragmentary perspective view of one of the sheaf carrying arms showing the means for adjusting the hooks mounted on the lower end thereof.

Fig. 17 is a perspective view of one of the hooks.

Like characters of reference refer to like parts in the several figures.

Figure 5:
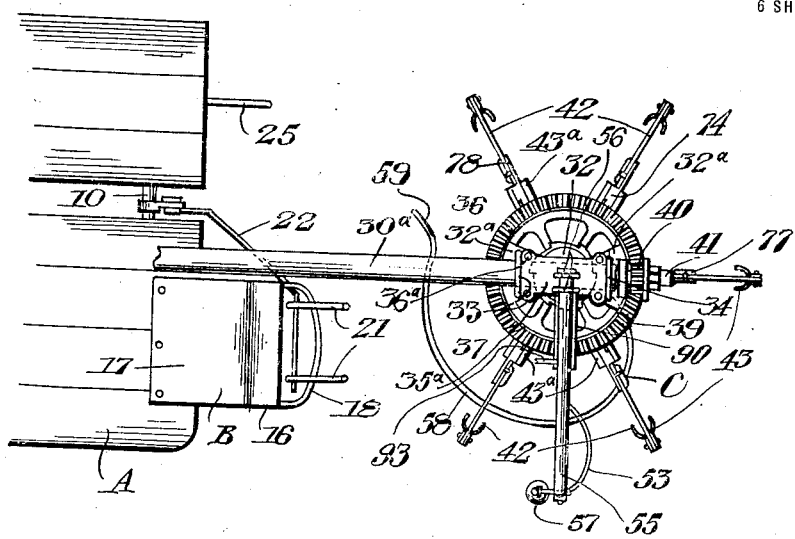
Fig. 5 is a fragmentary frame view of the binder deck showing the location of the shock forming mechanism.

Referring to the drawings, A represents the binder deck below which is operatively mounted the rock shaft 10 provided intermediate of its ends with a compressor arm 11, the end of the shaft being bent to form a crank arm 12, which is connected through the link 13 with a sprocket 14 mounted on the transversely extending knotter shaft 15, the said sprocket being adapted to actuate the knotting mechanism usually associated with a binder.

The several parts above enumerated are of known construction in the art, so that it is deemed unnecessary to further describe the same.

The deck A is provided, at the discharge edge and toward the rear thereof, with an extension B, consisting of a suitable frame 16, carrying a metallic plate 17, which is operatively secured thereto in any convenient manner and extends to a point adjacent to the front of the frame, which is bent curvilinearly as shown at 18. The front edge of the plate is secured to the front of the frame by the U-shaped strap 19, which is riveted or otherwise secured in position.

By reference to the drawings, it will be seen that the curvilinear portion 18, of the frame 16, projects sufficiently beyond the front of the plate 17 to form a space, which is subdivided by the U-shaped member 19 into openings 20, through which the angularly disposed fingers 21 are adapted to slidably operate. These fingers are loosely connected at their lower ends to one end of the offset arm 22 rigidly connected at the opposite end to the compressor arm 11, so that as the rocker shaft 10 is operated to intermittently depress and elevate the compressor arm, the fingers 21 will be simultaneously operated in a vertical direction.

Located intermediate of the compressor arm 11 and the crank member 12 of the rock shaft 10, is an adjustable crank member 23 provided with a bifurcated end rotatably engaging the offset arm 24 of the finger 25, which is adapted to coact with the curvilinear cam race 26 operatively supported below the binder deck A, adjacent to the said adjustable crank member, so that on actuation of the rock shaft 10, the finger 25 will ride over the outer end of the cam race 26 and be elevated or lowered.

The knotter shaft 15 is provided intermediate of its length with the member 1, to which the inner ends of the links 2 and 3 are pivotally attached, the outer ends of the links being pivotally connected to the offset delivery arms 4 and 5, intermediate of the length thereof. The shorter ends of the delivery arms are provided with rollers 6 and 7, adapted to coact with the cams 8 and 9 mounted on the fixed sleeve 30, so that the said cams are stationary or non-rotatable.

The cam 8 may, if found desirable, be braced by the shaft 44$^a$ by the brace 8$^a$ which loosely embraces the said shaft, in which case it would rock when the machine is adjusted vertically.

By reference to Fig. 9 of the drawings, it will be seen that the cams 8 and 9 are located on opposite sides of the member 1, and are so arranged relatively to each other that the roller 6 of the arm 4 will become disengaged from the cam 8 prior to the roller 7 of the arm 5 becoming disengaged from the cam 9, so that the arm 4 is freed from the butt of the sheaf allowing it to drop downwardly, while the delivery arm 5 continues on moving in an upward direction on its coacting cam, and therefore gives the head of the sheaf a greater throw than the arm 4, thereby facilitating up-ending the sheaf and carrying it into a vertical position.

The sleeve 30 surrounding the shaft 15 engages with the lower ends of the standards 29, the upper ends of which are rigidly connected to one end of the sleeve 30$^a$ extending in a stubbleward direction which sleeve 30$^a$ is supported intermediate of its length from the standards by the braces 31.

Operatively mounted on the standards 29, intermediate of their length thereof, is a bracket 65, pivotally connected to the upper end of the Z-shaped compressor arm 66, which is horizontally disposed, the outer arm being bent curvilinearly downwardly, as shown at 67, so that it may engage with the butt of the sheaf after it has passed the compressor arm 11 and compress the said butt.

The compressor arm 66 is provided adjacent to its pivoted end with a strap 68 to which one end of the spiral spring 69 is anchored, the other end being secured to the bracket 65, so that when the arm 66 is displaced on the delivery of a sheaf from the binder deck, the said arm will be returned to its normal position under the action of the spring.

The stook forming mechanism C consists of a plate 32 formed on diametrically opposite sides with lugs 32$^a$ and provided with upwardly extending projections 33$^a$ adapted to engage the sleeve 30$^a$ above which the plate 35$^a$ is secured by the bolts 36$^a$, the plate 35$^a$ carrying intermediate of its length staple bolts 56 adapted to engage with the rearwardly extending and downwardly disposed oscillating curvilinear arm 55, the lower end of which is bifurcated and adapted to rotatably support the roller 54.

The plate 32 is provided on its lower face with a downwardly extending boss 34$^a$ with which the upper end of the vertically disposed and non-rotatable shaft 38 rigidly engages.

The plate 32 is superimposed on the gear 39, which is rotatably mounted on the shaft 38 and secured in operative position by the pin $39^b$, while intermediate of the boss $34^a$ and the boss of the gear 39, a cup shaped tipping member 70 is located and rigidly secured in position relatively to the gear 39 by the spring controlled detent $39^a$ which engages with the serrations or teeth 72 in the radial flange 71.

The lower portion of the cup-shaped tipping member is provided with a peripheral pocket 73 adapted to engage with the vertically disposed rod 35 carried by the star-shaped connecting member 48 rotatably mounted on the shaft 38.

Rotatably mounted on the upper end of the shaft 38 is a lever 90 provided intermediate of its length with an inverted U-shaped bracket 91 carrying a spring controlled detent 92 designed to engage with the serrations 72 in the flange of the tipping member 70. The outer end of the lever 90 is connected to the link 93, which extends to a point adjacent to the driver's seat, so that the tipping member may be manually rotated when such is found necessary or desirable.

The gear 39 is provided with peripheral radially extending lugs $43^a$, to which the arm supporting member 74 is pivotally attached, the said member being provided with a tail piece 75 adapted to engage with the cam 76, carried by the lug $32^a$, to actuate or rock the said arm supporting member, which is provided at its outer end with horizontally and vertically disposed flanges 77 and 78 having orifices 79 and 80 therethrough.

The arm supporting member 74 is embraced by the lugs $43^a$ and the end of the horizontally disposed portion of the inverted L-shaped arm 42 is adapted to pass through the said lugs and arm supporting member, pivotally securing the same in position, the said arm being secured to the flange 77 by suitable bolting means engaging with the orifices 79.

The levers 45 are pivotally mounted intermediate of their length to the orifice 80 in the vertically disposed flange 78 of the arm supporting member 74, the inner end of each lever being connected by the link 47 to the star-shaped connecting member 48, while the outer end is connected to the link 81, the lower end of which is offset and adapted to adjustably engage with a tension screw 82. This tension screw is connected to the upper end of the link 44, which in turn is connected at its lower end to the hook member 43.

The hook member 43 is provided with an upper bifurcated end extending on both sides of the hook shank, one end being pivotally connected to the link 44, while the other end is pivotally connected to the lower end of the inverted L-shaped arm 42, so that undue stress of the sheaf on the hook members 43 is entirely obviated.

Rotatably mounted in the sleeve $30^a$ is a shaft 41 driven through the gears $42^a$ and $45^a$ from the vertical shaft $44^a$, which is in turn driven by the knotter shaft 15, by the gears $15^a$ and $16^a$, the end of the shaft 41 remote from the gears $42^a$ and $45^a$, being provided with a gear 40 adapted to mesh with the gear 39 of the stook forming mechanism C.

The shaft 38 is provided intermediate of its length with a collar 49 having a cam race 50 therein adapted to engage with the cam projection 51, carried by the curvilinear arm 52 slidably mounted on the said shaft and capable of being elevated by the cam projection 51 as the said arm is rotated. The lower end of this arm is secured to one end of the flexible member 53 which passes over the roller 54 mounted on the lower bifurcated end of the curvilinear arm 55, the free end of the flexible member being provided with a weight 57 adapted to trail upon the ground.

The lower end of the shaft 38 is further provided with a curvilinear member 58 which may be termed an abutment means or a fixed track member having an offset free end 59, the other end being connected to the shaft by the clamp 60, permitting of the ready adjustment of the said member when such is found necessary or desirable.

It is essential that the stook forming mechanism C be adjusted in a vertical direction to suit the length of grain being cut, and to this end I attach a connecting rod 61 to the upper end of the standards 29, the other end of the rod being connected to the lever 62, which is operatively mounted on the binder frame, and is provided with a detent 63 adapted to coact with the quadrant 64, so that the lever may be held in the desired position and so hold the shock forming mechanism at the required elevation.

When a binder fitted with this mechanism is in use, the sheaves are delivered against the compressor arm 11, and owing to the rotation of the sprocket 14, the rocker shaft 10 is actuated through the link 13 to depress the said arm and so allow the sheaf to be delivered to the front of the deck A, where the head of the sheaf will rest upon the extension B.

The butt of the sheaf is supported by the finger 25, which during the depression of the compressor arm 11, is elevated by the rotation of the shaft 10, causing the upper or inner end of said finger to engage with the edge of the cam surface 26, which causes the finger to be angularly disposed upwardly to hold the butt of the sheaf in the desired position.

In this position, it will be understood, the butt of the sheaf is also engaged by the compressor arm 66 and held in the desired position until the delivery arms 4 and 5 discharge the sheaves from the binder deck A.

It will be readily seen that the rollers 6 and 7 of the delivery arms 4 and 5, will, on rotation of the member 1, engage with the stationary cams 8 and 9, and since these cams are arranged in such a manner that the delivery arm 4 is disengaged from the cam 8 prior to the delivery arm 5 from the cam 9, the butt of the sheaf will be allowed to fall slightly downwardly since it is freed earlier from the delivery arm than the head, which will be thrown upwardly by the delivery arm 5, so facilitating the upending of the sheaf.

As soon as the sheaf has passed the compressor arm 11, the said arm is returned to its normal position in the usual manner common to binders, and during this operation the fingers 21 are elevated to engage with the head of the sheaf, while the finger 25 is now lowered, causing the butt of the sheaf to be slightly lowered as above stated, and allows the arm 5 to throw the sheaf clear of the binder deck A.

The sheaf is now engaged by the hook 43 of one of the arms 42 of the stook forming mechanism C, which has been thrown outwardly as shown in Fig. 1, by the tongue 75 of the arm supporting member 74 engaging with the cam 76. The butt of the sheaf engages during this operation with the offset end 59 of the curvilinear member 58, so completing upending the sheaf in the desired manner, and when the arm supporting member 74 becomes disengaged from the cam 76, the arm will return to its normal vertical position and clear the extension B of the deck A, and the next sheaf delivered against the compressor arm 11, will on depression of the said compressor arm, be delivered to the deck extension B and supported in the manner already described.

It will be understood that simultaneously with the operation of the rock shaft 10, rotary motion is transmitted to the shaft 41 from the binder mechanism, so that the pinion 40 meshing with the gear 39, causes the stook forming mechanism C to be rotated, so permitting the hook 43 of each arm 42 in turn, to engage with the sheaves as they are delivered from the binder deck A.

After the sheaves are engaged by the hook 43, the butts impact with the offset end 59 of the member 58 upending the sheaves and causing the heads to overhang the curvilinear member 58, so that even although the sheaf is subjected to jarring, caused by the machinery of the binder, it will be prevented from inadvertently slipping downwardly to destroy the formation of the stook being built.

During the rotation of each of the arms 42 around the shaft 38, each sheaf will follow the curvature of the member 58, and when the hooks 43 of the several arms 42, have all been filled, the first sheaf will be embraced by the curvilinear member 58, while the others will be built around the same.

Figure 8:
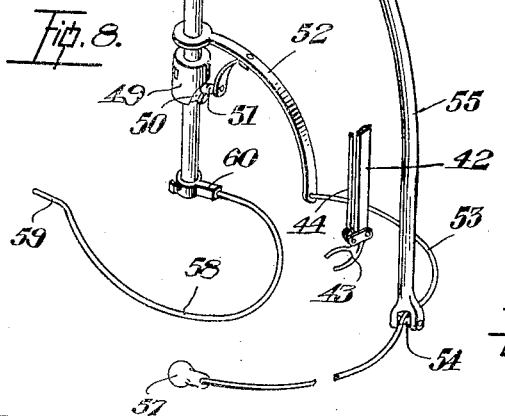
Fig. 8 is a fragmentary perspective view of the shock forming mechanism showing the flexible member designed to hold the sheaves in position during the depositing of the shock, also the curvilinear member adapted to support the heads of the sheaves during this operation.

By reference to Fig. 8, it will be seen that the arms 52 and 55 extend rearwardly of the stook forming mechanism C, so that the first arm 42 carrying the sheaf will engage with the flexible member 53 and rotate the arm 52 around the shaft 38 and during this operation, the cam projection 51 coacts with the cam race 50 in a collar 49, causing the arm 52 to be elevated, insuring the member 53 engaging with each of the following arms 42, so that when the several hooks 43 have all been filled with sheaves, the stook so formed is surrounded by the flexible member 53.

The rod 35 will, when the hooks 43 are all filled with sheaves be in alinement with the peripheral depression 73 in the cup-shaped tipping member 70. The weight of the sheaves on the hooks 43 will tend to rotate the said hooks outwardly about their pivotal point, but during the period at which the hooks are being filled with sheaves such tendency is overcome by the star shaped member 48 being held in lowered position due to the fact that the rod 35 is in engagement with the underface of the cup-shaped tipping member 70.

As soon as the rod 35 comes into alinement with the depression 73 the tendency of the hooks 43 to be rotated outwardly by the weight of the sheaves causes a pull to be transmitted to the links 44 and 81, which pull will tilt the levers 45 so that the star wheel is now moved upwardly and the rod 35 enters the depression in the cup-shaped tipping member 70.

The upward movement of the rod 35 allows the hook members 43 to assume such an angle as will permit of all the sheaves being simultaneously deposited in the form of a stook, and during this dumping operation the flexible member 53 surrounds the heads of the sheaves binding the same together to give the best possible form to the stook.

During this operation of depositing a stook, the rear sheaves will be supported by the curvilinear member 58, so that they cannot impact violently with the front sheaves and tend to upset the same, and it will be understood that the inclination of the front sheaves is such that they engage the ground in the best manner to form a shock.

The arm 55 during the formation of a stook is oscillated by the flexible member 53 in a stubbleward direction, so that it clears the stook and after passing the same the flexible member on becoming loosened, will permit of the said arm alternately returning to its normal vertical position rearwardly of the machine prior to the forming of a second stook when the above operations are repeated.

When the machine has reached the end of a cut, it may be that the number of sheaves gathered by the stook forming mechanism C is not sufficient to form a complete stook, and therefore will not automatically drop the sheaves before a new cut is started. In order to accomplish this the driver of the binder operates the link 93, thereby rotating the lever 90 about the upper end of the shaft 38. The detent 92 will thus engage with the serrations 72 and rotate the tipping member 70 through a predetermined distance for each movement of the lever until the peripheral pockets 73 engage with a rod 35 of the star-shaped member 48, allowing the same to become elevated and so drop the sheaves carried by the hooks 43 in the manner above described. A new cut of grain may then be started so that the stook formed and deposited will be in alinement with the stooks formed from the previous cut.

As many changes could be made in the above description and many apparently widely different embodiments of my invention within the scope of the claims constructed without departing from the spirit or scope thereof, it is intended that all matter contained in the accompanying specification and drawings shall be interpreted as illustrative and not in a limited sense.

What I claim as my invention is:

1. In a sheaf shocker and in combination a sheaf supporting mechanism, said sheaf supporting mechanism comprising a plurality of hook members arranged about a center shaft and rotatable about said shaft and abutment means against which the butts of the sheaves impact when carried by the hook members, said abutment means having a free space above it to permit the heads of the sheaves to overhang it in up-ending said sheaves, substantially as described.

2. In combination a binder deck, a sheaf supporting mechanism to one side of the binder deck and connected therewith comprising a center shaft having a plurality of hook members rotatable about said shaft and abutment means against which the sheaves abut and along which they are carried by said hook members to form the shock, substantially as described.

3. In combination a binder deck, a sheaf supporting mechanism to one side of the binder deck and connected therewith comprising a center shaft having a plurality of hook members, rotatable about said shaft and abutment means against which the sheaves abut and along which they are carried by said hook members to form the shock, the ends of the track member being spaced apart for receiving the first sheaf, to be surrounded by other sheaves placed by the hook members.

4. In a sheaf shocker and in combination a sheaf supporting mechanism located stubbleward of the binder deck comprises a center shaft having a plurality of hook members arranged in a circle therearound, and a curvilinear member supported by the center shaft and having an offset free end adapted to engage with and support the sheaves carried by the hooks, as and for the purpose specified.

5. In combination a binder deck, a sheaf shocker comprising a plurality of members arranged in substantially a circle for holding the sheaves and for dropping them to form a shock and supporting means for said members adjustable to different angles in respect to the binder deck to conform to the configuration of the ground upon which the shock is to be deposited, substantially as described.

6. In combination a binder deck, a sheaf shocker comprising a plurality of members arranged in substantially a circle for holding the sheaves and for dropping them to form a shock and supporting means for said members adjustable to different angles in respect to the binder deck to conform to the configuration of the ground upon which the shock is to be deposited, said supporting means including standards pivotally mounted at their lower ends and carrying a support for the said members at their upper ends and means for setting the standards in different positions.

7. In a sheaf shocker and in combination with the binder deck and compressor arm thereof, a shaft supporting said arm, of means operated from said shaft for engaging and retarding the heads of the sheaves after passing the compressor arm, and means for simultaneously actuating the said means with the compressor arm.

8. In a sheaf shocker and in combination with the binder deck and compressor arm thereof, of means for engaging and retarding the heads of the sheaves after passing the compressor arm, means for simultaneously supporting the butt of the sheaf, and means for simultaneously actuating the above said means.

9. In a sheaf shocker and in combination with the binder deck and compressor arm thereof, of means for engaging and retarding the heads of the sheaves after passing the compressor arm, a pivotally mounted finger engaging the butt of the sheaf, and means for simultaneously elevating the said means and depressing the said finger.

10. In a sheaf shocker and in combination with the binder deck and compressor arm thereof, a shaft supporting said arm, of means for supporting the butt of a sheaf after passing the compressor arm, and means carried by said shaft for depressing the said means when the compressor arm is returned to its normal uppermost position.

11. In a sheaf shocker and in combination with the binder deck and compressor arm thereof, a shaft supporting said arm, of an extension on the deck, fingers slidably mounted in front of the deck extension, and means operated from the shaft for simultaneously operating the said fingers with the compressor arm, said extension locating the fingers a distance from the compressor arm to receive a sheaf between them.

12. In a sheaf shocker and in combination with the binder deck and compressor arm thereof, of a deck extension adapted to support the head of a sheaf after passing the compressor arm, a finger adapted to support the butt of a sheaf while its head rests on the extension, and cam means for actuating the finger to receive the same when the compressor arm is lowered and lower the same when the compressor arm is raised.

13. In a sheaf shocker and in combination a sheaf supporting mechanism located stubbleward of the binder deck, a flexible member coacting with the said mechanism and an oscillating arm extending rearwardly of the sheaf supporting mechanism adapted to coact with the flexible member.

14. In a sheaf shocker and in combination a sheaf supporting mechanism located stubbleward of the binder deck comprising a plurality of hook members arranged in a circle about a center shaft, a curvilinear arm slidably mounted on the shaft, cam means for elevating the arm, an oscillating arm extending rearwardly of the sheaf supporting mechanism, and a flexible member secured to the curvilinear arm and coacting with the oscillating arm.

In testimony whereof I have signed at New Liskeard, Ontario, this 8th day of January, 1917.

WILLIAM HUMPHREY PERRIN.

In the presence of—
ARTHUR PERRIN,
EDITH MONA GOLD.